United States Patent
Blumenau

(10) Patent No.: US 6,434,614 B1
(45) Date of Patent: Aug. 13, 2002

(54) TRACKING OF INTERNET ADVERTISEMENTS USING BANNER TAGS

(75) Inventor: Trevor Blumenau, Redwood City, CA (US)

(73) Assignee: Nielsen Media Research, Inc., Schaumburg, IL (US)

( * ) Notice: Subject to any disclaimer, the term of this patent is extended or adjusted under 35 U.S.C. 154(b) by 0 days.

(21) Appl. No.: 09/086,813

(22) Filed: May 29, 1998

(51) Int. Cl.[7] .............................................. G06F 13/00
(52) U.S. Cl. ........................ 709/224; 709/203; 709/217
(58) Field of Search ................................ 709/200, 201, 709/203, 220, 221, 217, 218, 219, 224, 226

(56) References Cited

U.S. PATENT DOCUMENTS

| | | | | |
|---|---|---|---|---|
| 5,675,510 A | | 10/1997 | Coffey et al. ............ 364/514 A |
| 5,796,952 A | * | 8/1998 | Davis et al. ................ 709/203 |
| 5,809,481 A | * | 9/1998 | Baron et al. ................... 705/14 |
| 5,933,811 A | * | 8/1999 | Angles et al. ................. 705/14 |
| 5,948,061 A | * | 9/1999 | Merriman et al. ........... 709/219 |
| 5,960,409 A | * | 9/1999 | Wexler ......................... 705/14 |
| 5,991,735 A | * | 11/1999 | Gerace ........................ 705/10 |
| 5,999,912 A | * | 12/1999 | Wodarz et al. ................ 705/14 |
| 6,006,197 A | * | 12/1999 | d'Eon et al. .................. 705/10 |
| 6,014,698 A | * | 1/2000 | Griffiths ..................... 709/224 |
| 6,052,730 A | * | 4/2000 | Fekiano et al. ............. 709/225 |
| 6,317,761 B1 | * | 11/2001 | Landsman et al. .......... 707/513 |

* cited by examiner

*Primary Examiner*—Moustafa M. Meky
(74) *Attorney, Agent, or Firm*—Katten Muchin Zavis Rosenman

(57) ABSTRACT

Each of a plurality of advertising meters operates on a computer at a corresponding statistically selected site. Each advertising meter is arranged to detect tags from click-through URLs in advertising banners contained in messages communicated to the computer from remote content suppliers over a communication link. Each advertising meter is also arranged to communicate the tags to a remote central facility for use in assembling reports.

33 Claims, 2 Drawing Sheets

TRACKING OF INTERNET ADVERTISEMENTS USING BANNER TAGS

TECHNICAL FIELD OF THE INVENTION

The present invention relates to an arrangement whereby advertising meters are located at statistically selected sites in order to meter access to, and use of, advertising communicated to the sites over a communication medium such as the Internet.

BACKGROUND OF THE INVENTION

The Internet has proven to be an efficient and popular mechanism for the dissemination of information from content providers to content recipients. Content providers in many cases are organizations, such as businesses, governmental agencies, educational institutions, and the like, who operate Web sites where such organizations provide information that can be downloaded by content recipients. The content recipients are often consumers who use computers usually located in their dwellings to access the content provided by content providers. However, content recipients may also be other businesses, governmental agencies, educational institutions, and the like. In many cases, a content provider is also a content recipient.

The information provided by content providers to content recipients often includes advertisements in which organizations advertise their goods and/or services. This information is typically provided directly by a Web site to content recipients. Additional information concerning such advertisements is frequently provided at another Web site and is accessed by way of click-through URLS.

The operators of Web sites offering advertisements to content recipients, as well as those who create and place advertisements as offerings by Web sites, have an interest in the success of such advertisements. Success is typically measured by the amount of interest that advertisements generate. While exposure to an advertisement is typically determined, in terms of the Internet, by the number of hits on particular advertising offerings, interest is determined by clicks on click-throughs. Web site owners, and those who create and place advertisements, may then draw market relevant conclusions from the amount of interest exhibited in their advertisements.

Several arrangements have been proposed in order to measure this exposure and/or interest. For example, it is known for a Web site to itself measure the exposure in the content which it offers by determining the number of hits on its content offerings. However, such a measurement provides little information about interest in the advertisements and other information accessible through the click-throughs in the its content. Moreover, this exposure is localized in that its measurement provides little information about exposure to, and/or interest in, content offered by other Web sites, such as competitive Web sites.

Therefore, it has also been proposed to install software meters on the computers of panelists so that the interest of the panelists can be measured and extrapolated over the population as a whole, in much the same way that TV ratings are generated. According to this proposal, the software meters track operating system messages in order to detect communications of interest. These software meters are arranged to log the titles of windows which are displayed to a computer user on the video display unit of a computer because Internet content, as well as application software interfaces, are provided to the user in a window format. However, logging titles of windows is not particularly useful because such titles can be very generic. For example, one such title which is popular with many content providers is simply "Home Page." This title provides little indication of the information provided to the content recipient.

Tagging of Internet content has been broadly suggested in the context of requiring widespread industry cooperation. However, it is unlikely that such widespread industry cooperation is attainable. Also, such broadly suggested tagging has not been particularly helpful because of the problems that could arise from indiscriminate tagging. For example, inserting a tag in a field or in a sub-object of content requires a decoder which is able to interpret the code that contains the tag. This requirement means that the decoder resident on a panelist's computer must be altered in a manner to detect the tag. Such an alteration is intrusive and many content recipients may, therefore, refuse to permit their equipment to be modified in such an intrusive way.

The present invention is directed to an arrangement for tracking advertisements which solves one or more of the problems noted above.

SUMMARY OF THE INVENTION

In accordance with one aspect of the present invention, a computer readable storage medium has program code stored thereon. The program code, when executed by a computer, performs the following tasks: a) detecting a tag in an advertising banner contained in a message communicated to the computer over an external communication link; b) logging the tag; and c) communicating the tag to a remote facility.

In accordance with another aspect of the present invention, a system comprises a plurality of meters and a remote central facility. Each meter operates on a computer at a statistically selected site, and each meter (i) detects a tag from click-through URLs contained in messages electronically communicated to the computer from remote content suppliers over a communication link, and (ii) communicates the tag to the remote central facility.

In accordance with yet another aspect of the present invention, a storage medium has program code stored thereon. The program code, when executed by a data processor, performs the following tasks: a) detecting a tag contained in a click-through URL of an Internet message communicated to the data processor over an external communication link; and b) storing the tag in a log.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
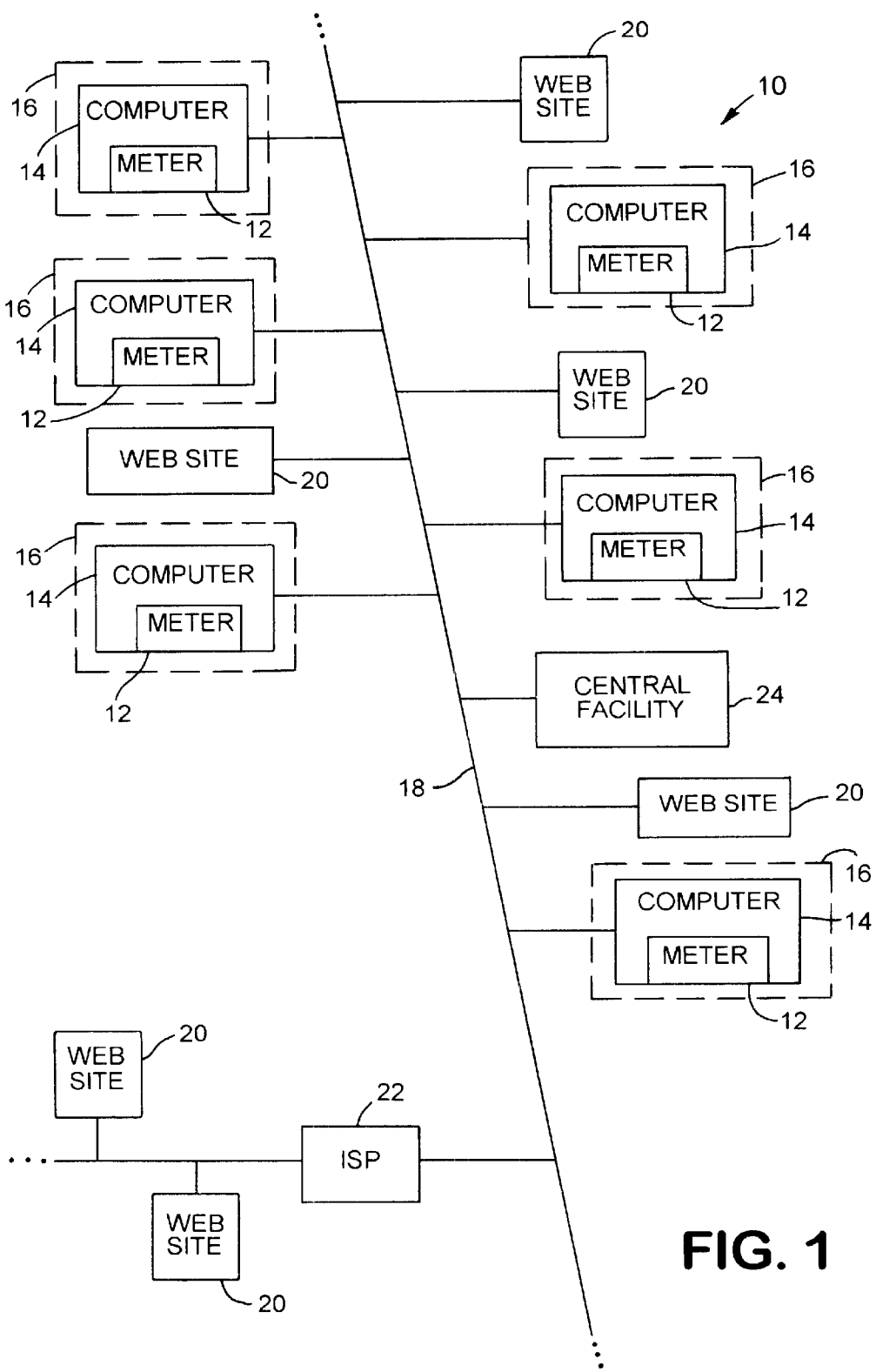
FIG. 1 illustrates an advertising metering system that is in accordance with the present invention and that includes a plurality of advertising meters each of which is resident on a computer at a corresponding statistically selected site; and, FIG. 2 illustrates an exemplary embodiment of an advertising meter which may be used for the advertising meters shown in FIG. 1.

An advertisement metering system 10 is shown in FIG. 1. The advertisement metering system 10 includes a plurality of meters 12, where each meter 12 is installed on a corresponding computer 14 at a corresponding statistically selected site 16. The number and location of these statistical sampling sites 16 depend upon statistical sampling methods. However, a sufficient number of statistically selected sites 16 should be selected in order to provide data which is representative of the population segments relevant to the advertisements being metered.

Each of the computers 14, as shown in FIG. 1, is connected to a network 18 which may be, for example, the Internet. As is known, the Internet is typically accessed through the public telephone network. However, the network 18 may involve other arrangements such as local area networks and other networks through which advertisements are electronically disseminated.

Advertisements are typically offered by content providers who operate Web sites, such as Web sites 20 shown in FIG. 1. Frequently, an advertisement offered by one Web site 20 has an associated click-through URL. This click-through URL, when clicked, accesses content provided by another Web site 20. Accordingly, the Web sites 20 are connected to the network 18, either directly or through an Internet Service Provider 22, and are arranged to provide content, usually through home pages, to the content recipients among which are the users of the computers 14 at the statistically selected sites 16.

The meters 12 may be in the form of software routines to be installed on the computers 14 at the statistically selected sites 16. Alternatively, the meters 12 may be software and/or hardware for attachment to the computers 14 at the statistically selected sites 16. The meters 12 meter access by the users of the computers 14 to the advertisements which are provided by the content providers operating the Web sites 20. The meters 12 may be arranged to meter the advertisements provided by the Web sites 20 by detecting tags (such as codes) embedded into click-through URLs, as discussed below.

The meters 12 may also be used to collect demographic information about the users of the computers 14 who access advertisements provided at the Web sites 20. For example, the meters 12 may be arranged to require the users to actively identify themselves at log on and/or whenever the users access the advertisements provided at the Web sites 20. Alternatively, the meters 12 may be arranged to passively identify the users, at log on and/or whenever the users access advertisements, by detecting keystroke differences between users, by employing face and/or body recognition technology, and/or the like.

The metered advertisement and demographic data collected by the meters 12 may be periodically tranferred to a central facility 24, where the information may be extrapolated over relevant populations and assembled into reports for use by interested customers of the central facility 24. This data may be manually transferred, such as by mailing diskettes to the central facility 24, or this data may be transferred electronically to the central facility 24, such as through the Internet.

Web pages provided by the Web sites 20 typically include several parts. These parts generally include text, links, images, and other types of media content. The core part of any such Web page is its HTML which describes the layout of the various parts of the page on the video displays of the computers 14. The HTML contains, for example, the text which is to appear on the page, references to images that should be included on the page which is displayed on the video displays of the computers 14, and any links associated with different parts of a page.

As an example, if a content recipient desires to search for the word "car" through use of a particular service provider, the content recipient may transmit, by use of the content recipients computer 14, a message over the Internet containing the following URL:

http://search.Server.com/bin/search?p=car where the name of the actual service provider has been generalized to the word "Server" in the above URL. This exemplary request could return the following exemplary page, which is designated herein as example (1):

```
(1)  <html>
       <head><title>Server! Search Results</title></head>
       <body>
         .
         .
         .
         <center> <p><a
         href="http://www.Server.com/M=10017.YS20.1.1/D=
         Server/K=car/A=31270/?http://www.AdProvider.com/
         awi-bin/in.awi?id=1045"><img width=468 height=60
         src="http://images.Server.com/adv/Adprovider/
         banner11.gif" alt="[AdProvider]" border=0></a><p>
         </center>
         .
         .
         .
         <CENTER>FONT SIZE="+1"><B>Server! Category Matches
           <FONT SIZE="-1">(1 - 20 
         of 79)</FONT></B></FONT></CENTER>
         <p><A HREF="http://www.Server.com/Business_and_
         Economy/Companies/Automotive/">Business and
         Economy: Companies: Automotive</A>
         <p><A HREF="http://www.Server.com/Recreation
         /Automotive/">Recreation: Automotive</A>
         <p><A HREF="http://www.Server.com/Business_and_
         Economy/Companies/Automotive/Manufacturers/
         ">Business and Economy: Companies: Automotive:
         Manufacturers</A>
         .
         .
         .
         <p><A HREF="http://www.Server.com/Business_and_
         Economy/Companies/Automotive/Rentals/Discount_Car_
         And_Truck_Rentals_Ltd_/">Business and Economy:
         Companies: Automotive: Rentals: Discount
         <b>Car</b> And Truck Rentals Ltd.</A>
         <p>
         <center> <p><a
         href="http://www.Server.com/M=10017.YS20.1.1/D=
         Server/K=car/A=31270/?http://www.AdProvider.com/
         awi-bin/in.awi?id=1045"><img width=468 height=60
         src="http://images.Server.com/adv/Adprovider/
         banner11.gif" alt="[Adprovider]" border=0></a><p>
         </center>
         .
         .
         .
         <hr><center><small><em>Copyright © 1994–98
         Server! Inc.</em> – <a
         href="http://www.Server.com/docs/info/">Company
         Information</a> – <a
         href="http://www.Server.com/docs/info/help.html"
         >Help</a></small></center></form>
       </body>
     </html>
``` where the name of the service provider providing the requested information has been generalized to the word "Server" and where the name of an ad provider providing an advertisement has been generalized to the word "AdProvider" in example (1).

It should be noted that the above HTML code contains (i) the actual text which is to appear on the video display of the requesting user's computer 14, (ii) references to the images that should appear, and (iii) the formatting and actual links associated with each element of the content. A browser, after receiving this HTML code from the service provider, constructs the page for the content recipient and then downloads the referenced images to complete the full page. Therefore, there are often multiple transfers of files, generally one text file for each HTML and several image files, in order to build a single page. As can be seen, the basic syntax that is used to include a linked image in a Web page is generally the following, which is designated herein as example (2):

<a href="http://www.destination.com/thepagetogoto.html"><img src="http://www.images.com/theimagefile.gif"></a>   (2)

This type of link is especially important for advertising. In the page shown as example (1) above, two advertising banners (shown in bold) are-included with variations of the syntax shown in example (2).

The vast majority of advertising on the Internet takes the form shown above in connection with example (1) where a GIF advertising banner is added to a Web page with links to other Web sites, i.e. Web sites providing other information such as more information about the displayed page or other advertisements. Although there are many exceptions to the use of GIF advertising banners, with many advertisers choosing to use one or more JPEG images or Java applets (or other media) as advertisements, it is a fundamental consequence of the design of Web technologies that there are two items that must be specified by an advertiser who wants to advertise on a Web site. These items are (i) the advertising banner (typically in the form of a GIF file) and (ii) the click-through location or link location where the user will be transferred if the user clicks on the advertisement.

In example (1) above, AdProvider (i.e., the advertising Web site) provided an image file called banner11.gif to the service provider. The image file was placed in the /adv/AdProvider sub-directory of the images.Server.com machine. AdProvider also provided to the service provider a click-through location according to the following syntax, which is designated herein as example (3):

http://www.AdProvider.com/awi-bin/in.awi?id=1045   (3)

The service provider chose to modify the click-through location for its own purposes. Thus, instead of using the syntax of example (3), the service provider chose to use instead the following syntax, which is designated herein as example (4):

http://www.Server.com/M=10017.YS20.1.1/D=Server/K=car/A=
31270/?http://www.AdProvider.com/awi-bin/in.awi?id=1045   (4)

The URL of example (4) is called a click-through URL, and when used for an advertising banner, is typically provided in an HREF link. A click-through URL is sometimes referred to as a pass-through URL. A redirect URL is a type of click-through URL. For convenience, all such URLs are referred to herein as click-through URLs. When a user is transferred to the page identified by this click-through URL, the user is automatically forwarded to the original AdProvider URL. The service provider merely adds its own prefix to all redirect locations so that the service provider can track the click-through performance of any advertising banner. That is, if a user has clicked on a banner without this redirect feature, the service provider might never have known about it. The URL that the AdProvider provided actually becomes a parameter handed to the redirect script.

Accordingly, by modifying the basic syntax of example (2) to the following syntax, which is designated herein as example (5):

<a href="http://www.destination.com/thepagetogo
to.html?Tag"><img src="http://www.images.com/theimagefile.gif"></a>   (5)

where Tag is an identifying label, all advertising banner placements can be easily tagged. It is a simple matter for the advertiser, when giving the click-through URL to the Web site, to append the tag. So, in the service provider example above, AdProvider would specify a URL according to the following, which is designated herein as example (6):

http://www.AdProvider.com/awi-bin/in.awi?id=1045+Tag   (6)

and Server may re-encode this URL as follows, which is designated herein as example (7):

http://www.Server.com/M=10017.YS20.1.1/D=Server/K=car/A=
31270/?http://www.AdProvider.com/awi-bin/in.awi?id=1045+
Tag   (7)

The identifying label Tag that AdProvider uses for each of its placements can be selected, issued, and controlled by the central facility 24. Each advertisement should have associated therewith a unique Tag. As a customer of the central facility 24, AdProvider can be asked to add the designated tag (or a series of tags) to any and all advertisements it wants the operator of the central facility 24 to include in its reports. The tag can then be easily recorded by the meters 12 operating on the computers 14 at the statistically selected sites 16 when the users of the computers 14 at these sites receive and/or view a banner which is provided with this type of tag.

There are basically two types of URLs, i.e., static URLs and dynamic URLS, and either may be used as click-through URLs. Static URLs are generally provided in accordance with the following syntax, which is designated herein as example (8):

http://www.destination.com/somepath/atextpage.html http://www.destination.com/animagefile.gif   (8)

Dynamic URLs are generally provided in accordance with the following syntax, which is designated herein as example (9):

http://www.destination.com/cgi-bin/createpage.cgi http://www.destination.com/cgi-bin/runscript?param1=50+param2=
60 http://www.destination.com/scripts/databaselookup?row=5+col-
umn=4+tablename=Addresses   (9)

While static URLs cause return of just the contents of a file on a Web site, dynamic URL's cause the Web site to execute code which actually creates a Web page. In the case of a dynamic URL, adding a parameter called Tag has no effect on the execution of the program. Any program would simply ignore this parameter and run the same way whether the parameter is set or not. Accordingly, modifying the dynamic URLs of example (9) according to the following syntax, which is designated herein as example (10):

http://www.destination.com/cgi-bin/createpage.cgi?Tag http://www.destination.com/cgi-bin/runscript?param1=50+param2=60+Tag http://www.destination.com/scripts/databaselookup?row=5+column=4+tablename=Addresses+Tag                (10)

has no effect.

Furthermore, most Web server software packages currently being used (certainly the Web server software packages used by many, if not all, of the most popular Web servers) ignore this parameter. Accordingly, the following syntax, which is designated herein as example (11):

http://www.destination.com/some/other/path/astatic page.html    (11)

is treated the same as the following syntax:

http://www.destination.com/some/other/path/astatic page.html?Tag

Figure 2:
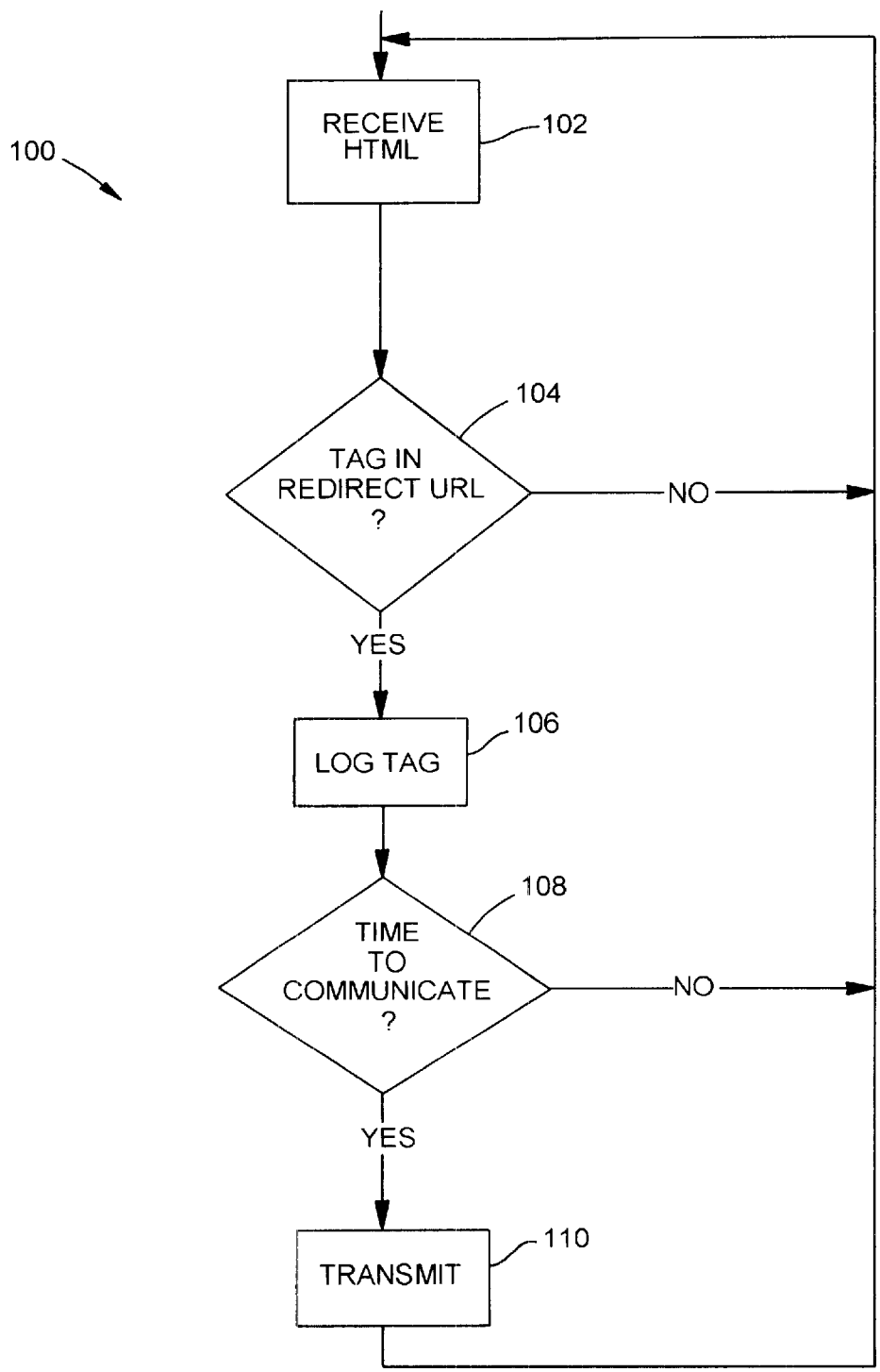

Each of the meters 12 can be implemented in accordance with a software routine 100 that is illustrated in FIG. 2. When a message containing a click-through URL is received by the computer 14 executing the software routine 100, as indicated by a block 102, the software routine 100 determines at a block 104 whether the received click-through URL contains a tag. If a tag is not found in a click-through URL, program flow returns to the block 102 to wait for the next message containing a click-through URL. However, if a tag is found, the software routine 100 logs the tag at a block 106 by storing the tag in a log file, which may also store other relevant information such as demographic information.

The software routine 100 at a block 108 then determines whether it is time to communicate the log file to the central facility 24. This timing may be determined by the user of the computer 14, but is preferably determined by the central facility 24 that provides the software routine 100 for use on the computers 14. For example, the software routine 100 may be arranged to communicate the log file to the central facility 24 immediately upon detection of the tag. In this case, the log file transmitted to the central facility 24 is a log file containing only one tag and any other relevant information. This timing may be referred to as echoing because the software routine 100 essentially echos the tag provided from one of the Web sites 20 to the central facility 24.

Alternatively, the software routine 100 may be arranged to communicate the log file of tags after a predetermined number of passes through the software routine 100. As another alternative, the software routine 100 may be arranged to transmit the log file during a time when 20 Internet traffic is low and the user's computer 14 is on. As still other alternatives, the software routine 100 may be arranged to remind the user to transmit the log file at power down or power up of the user's computer 14 or at any time therebetween, or the software routine 100 may be arranged to transmit the log file when the log file contains a predetermined amount of information. Yet other alternatives are possible.

In any of the alternatives described above, the software routine 100 may be provided with the capability of constructing an Internet message containing (i) the URL of the central facility 24, (ii) the log file of accumulated tags, and (iii) other relevant information.

If it is time for the software routine 100 to communicate the log file to the central facility 24, the software routine 100 at a block 110 transmits the log file to the central facility 24. After the software routine 100 at the block 110 transmits the log file to the central facility 24, or if it is not time to communicate the tags to the central facility 24, program flow returns to the block 102.

Accordingly, with the present invention, advertising banners can be tagged and, therefore, exposures to these advertising banners can be counted and analyzed. It is relatively easy for a customer of the central facility 24 to add this type of tag to a banner placement. The tags can be easily scanned by the meters 12. Both viewings and click-throughs can be easily recorded by the meters 12 and analyzed by the central facility 24. Tagging is basically the same whether the images are GIF images or JPEG images. A tag as described above has no impact on either the content recipients or the content providers. That is, by appending tags to the click-through URL's in advertising banners, the tags have no impact on the performance or behavior of either the customer of the central facility 24 or the service provider or other Web site in the workings of the Internet.

Certain modifications of the present invention have been discussed above. Other modifications will occur to those practicing in the art of the present invention. For example, although example (1) and the accompanying discussion relate to a service provider and an advertiser, it should be understood that any combination of Web sites can provide pages with click-through URLs.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A computer readable storage medium having program code stored thereon, wherein the program code, when executed by a computer of a content recipient, performs the following tasks:

a) detecting a tag in an advertising banner contained in a message communicated to the computer of the content recipient over an external communication link, the tag comprising code not including an address;

b) logging the tag; and, c) communicating the tag to a remote facility.

2. The computer readable storage medium of claim 1 wherein the message is an Internet message, and wherein the tag is located in a URL of the Internet message.

3. The computer readable storage medium of claim 1 wherein the message is an Internet message, and wherein the tag is located in a click-through URL of the Internet message.

4. The computer readable storage medium of claim 1 wherein the message is an Internet message having the following general syntax:

<a href="http://www.destination.com/thepagetogoto.html"><img src="http://www.images.com/theimagefile.gif"></a> wherein the tag has substantially the following location in the Internet message:

<a href="http://www.destination.com/thepageto
       goto.html?abcd"><img src="http://www.images.com/theimagefile.gif"></a> and wherein the tag is designated in the Internet message as abcd.

5. The computer readable storage medium of claim 1 wherein the tag is a first tag, wherein task b) includes the task of logging a second tag, and wherein task c) comprises the task of communicating the first and second tags to the remote facility.

6. The computer readable storage medium of claim 5 wherein the external communication link is a first external communication link, and wherein task c) comprises the step of communicating the first and second tags electronically to the remote facility over a second external communication link.

7. The computer readable storage medium of claim 6 wherein the second external communication link is the Internet.

8. The computer readable storage medium of claim 6 wherein the second external communication link is a public telephone network.

9. The computer readable storage medium of claim 1 wherein the external communication link is a first external communication link, and wherein task c) includes the task of communicating the tag electronically over a second external communication link.

10. The computer readable storage medium of claim 9 wherein the second external communication link is the Internet.

11. The computer readable storage medium of claim 9 wherein the second external communication link is a public telephone network.

12. The computer readable storage medium of claim 9 wherein the first external communication link is the second external communication link.

13. A system comprising a plurality of meters and a remote central facility, wherein each meter operates on a computer at a statistically selected site, and wherein each meter (i) detects a tag from click-through URLs contained in messages electronically communicated to the computer from remote content suppliers over a communication link, the tag comprising code not including an address, and (ii) communicates the tag to the remote central facility.

14. The system of claim 13 wherein the meter is arranged to store the tag in a log and to communicate the log to the remote central facility.

15. The system of claim 13 wherein the message is the Internet message having the following general syntax:

<a href="http://www.destination.com/thepagetogoto.html"><img src="http://www.images.com/theimagefile.gif"></a> wherein the tag has substantially the following location in the Internet message:

<a href="http://www.destination.com/
thepagetogoto.html?abcd"><img src="http://www.images.com/theimagefile.gif"></a> and wherein the tag is designated in the Internet message as abcd.

16. The system of claim 15 wherein the meter is arranged to store the tag in a log and to electronically communicate the log to the remote central facility.

17. The system of claim 13 wherein the communication link is a first communication link, wherein the tag is a first tag, and wherein the meter is arranged to store the first tag and a second tag and to electronically communicate the first and second tags to the remote central facility over a second communication link.

18. The system of claim 17 wherein the second communication link is the Internet.

19. The system of claim 17 wherein the second communication link is a public telephone network.

20. The system of claim 17 wherein the first communication link is the second communication link.

21. The system of claim 13 wherein the communication link is a first communication link, and wherein the meter is arranged to communicate the tag electronically over a second communication link.

22. The system of claim 21 wherein the second communication link is the Internet.

23. The system of claim 21 wherein the second communication link is a public telephone network.

24. The system of claim 21 wherein the first communication link is the second communication link.

25. The system of claim 13 wherein the meter is an advertising meter, and wherein the advertising meter is arranged to detect the tag from the click-through URLs in advertisements communicated electronically to the computer.

26. The system of claim 25 wherein the click-through URLs are in advertising banners.

27. A storage medium having program code stored thereon, wherein the program code, when executed by a data processor of a content recipient, performs the following tasks:

a) detecting a tag contained in a click-through URL of an Internet message communicated to the data processor of the content recipient over an external communication link, the tag comprising code not including an address;

b) storing the tag in a log file; and c) communicating the log file to a remote facility.

28. The storage medium of claim 27 wherein task c) comprises the task of communicating the log file electronically over a communication link.

29. The storage medium of claim 28 wherein the communication link is the Internet.

30. The storage medium of claim 28 wherein the communication link is a public telephone network.

31. The storage medium of claim 27 wherein task a) comprises the task of detecting the tag from the click-through URL in an advertisement communicated electronically to the data processor.

32. The storage medium system of claim 31 wherein the click-through URL is in an advertising banner.

33. A storage medium having program code stored thereon, wherein the program code, when executed by a data processor of a content recipient, performs the following tasks:

a) detecting a tag contained in a click-through URL of an Internet message communicated to the data processor of the content recipient over an external communication link, the tag comprising code not including an address; and b) storing the tag in a log file, wherein the Internet message has the following general syntax:

<a href="http://www.destination.com/
thepagetogoto.html?abcd"><img src="http://www.images.com/theimagefile.gif"></a>;

wherein the tag has substantially the following location in the Internet message:

<a href="http://www.destination.com/thepagetogoto.html"><img src="http://www.images.com/theimagefile.gif"></a>;

and wherein the tag is designated in the Internet message as abcd.

* * * * *